Patented Aug. 25, 1936

2,052,264

UNITED STATES PATENT OFFICE 2,052,264

DICHLORODIISOPROPYL ETHER AND PROCESS FOR MAKING THE SAME

Jacob N. Wickert, Charleston, W. Va., assignor, by mesne assignments, to Union Carbide and Carbon Corporation, a corporation of New York No Drawing. Application April 30, 1931, Serial No. 534,138

6 Claims. (Cl. 260—151)

The invention relates to a new dichloro derivative of diisopropyl ether, and includes a process for making the new compound. The latter is a liquid, water-white when pure, having a specific gravity of 1.1127 at 20° C. and a boiling point of 187.1° C. It appears to have the structural formula

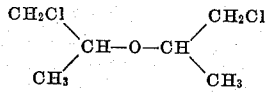

and may be called $\beta,\beta'$ dichlorodiisopropyl ether, or bis $\beta$ chloroisopropyl ether. The new compound is useful in various chemical syntheses, and has a high-boiling chlorinated solvent.

$\beta,\beta'$ dichlorodiisopropyl ether can be prepared by dehydrating $\beta$ chloroisopropyl alcohol (propylene chlorhydrin). The following example is illustrative of the invention:

Five hundred grams of propylene chlorhydrin ($\beta$ chloroisopropyl alcohol) and 100 grams of concentrated sulfuric acid (sp. gr. 1.84) were placed in a 5 liter round bottom flask under a reflux condenser, the condenser was regulated so as to permit the removal of water formed in the reaction while condensing and returning the higher boiling compounds to the flask. The contents of the flask were heated to boiling for 3 hours. At the end of this time the reaction mixture was diluted with an equal volume of water and distilled without rectification. When the distillate was free of oily particles, the residue in the flask was discarded. The ether settled from the distillate as an oily layer which was mechanically separated from the water, dried over potassium carbonate, and distilled under reduced pressure. A good yield of the dichlorodiisopropyl ether was recovered as a water-white liquid.

I prefer to purify the bis $\beta$ chloroisopropyl ether by distillation under reduced pressure to avoid decomposition of the compound, which may occur when the ether is heated to its boiling point at atmospheric pressure.

The invention is not to be regarded as in any sense limited to the specific example presented, but is susceptible of wide modification within the scope of the appended claims.

I claim:

1. As a chemical compound, $\beta,\beta'$ dichlorodiisopropyl ether having a boiling point of about 187.1° C. and a specific gravity of about 1.1127 at 20° C.

2. A process for making $\beta,\beta'$ dichlorodiisopropyl ether, which comprises reacting $\beta$ chlorisopropyl alcohol in the presence of a solution of an acid dehydrating agent to effect dehydration between two molecules of the said alcohol while retarding other conversion reactions.

3. A process for making $\beta,\beta'$ dichlorodiisopropyl ether which comprises heating $\beta$ chloroisopropyl alcohol with about 20% of its weight of concentrated sulfuric acid.

4. A process for making $\beta,\beta'$ dichlorodiisopropyl ether, which comprises dehydrating $\beta$ chlorisopropyl alcohol in the presence of an inorganic acid dehydrating agent, thereby forming $\beta,\beta'$ dichlorodiisopropyl ether, and recovering the latter from the resultant reaction mixture.

5. A process for making $\beta,\beta'$ dichlorodiisopropyl ether, which comprises treating $\beta$ chlorisopropyl alcohol with sulfuric acid of dehydrating strength, and separately recovering the said ether thus produced.

6. A process for making $\beta,\beta'$ dichlorodiisopropyl ether, which comprises dehydrating $\beta$ chlorisopropyl alcohol in the presence of sulfuric acid of dehydrating strength, thereby effecting dehydration between two molecules of the said alcohol and forming the said ether, and recovering the ether from the resultant reaction mixture.

JACOB N. WICKERT.